H. CHRISTENSEN.
APPARATUS FOR PASTEURIZING OR STERILIZING LIQUIDS.
APPLICATION FILED JULY 19, 1907.
916,532.
Patented Mar. 30, 1909.
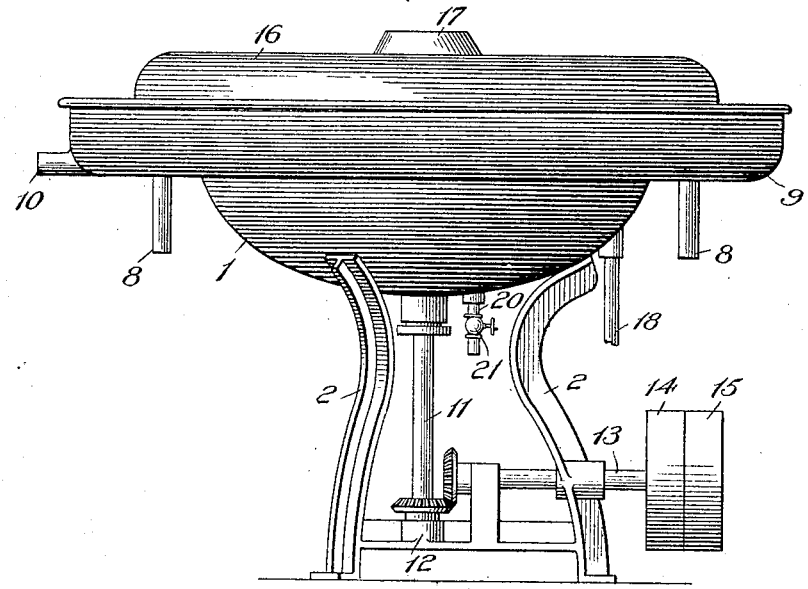
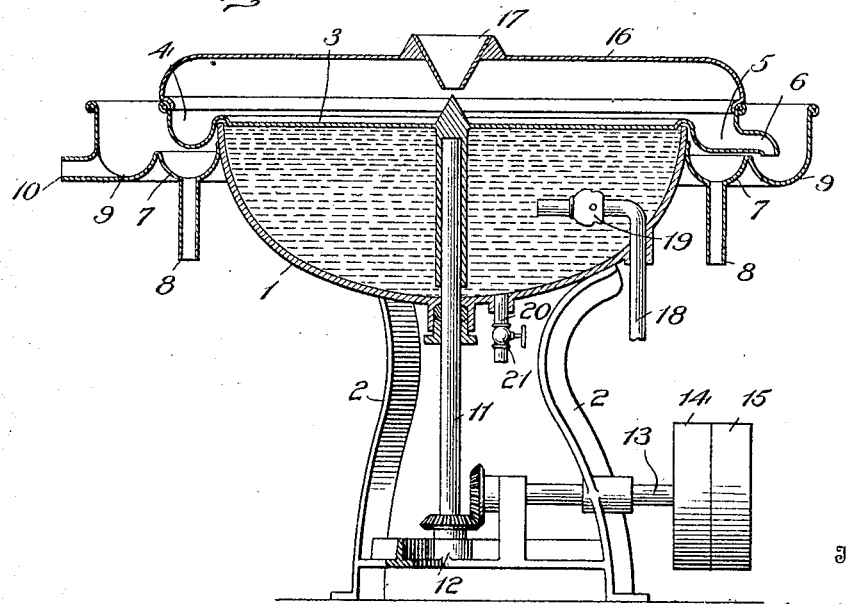

UNITED STATES PATENT OFFICE.

HANS CHRISTENSEN, OF CANTON, OHIO, ASSIGNOR TO THE MILLER PASTEURIZING MACHINE COMPANY, OF CANTON, OHIO, A CORPORATION OF NEW JERSEY.

APPARATUS FOR PASTEURIZING OR STERILIZING LIQUIDS.

No. 916,532.    Specification of Letters Patent.    Patented March 30, 1909.

Application filed July 19, 1907. Serial No. 384,643.

*To all whom it may concern:*

Be it known that I, HANS CHRISTENSEN, a citizen of the United States, residing at Canton, in the county of Stark and State of Ohio, have invented certain new and useful Improvements in Apparatus for Pasteurizing or Sterilizing Liquids, of which the following is a specification, reference being had therein to the accompanying drawings.

This invention relates to apparatus for pasteurizing or sterilizing liquids, and is particularly adapted for the pasteurization or sterilization of milk and cream.

It pertains particularly to improvements in apparatus for pasteurizing or sterilizing liquids, of the class shown in Letters Patent of the United States No. 476,441, to Carl J. Bjorlin, patented June 7th, 1892.

One of the particular objects of the invention is to provide an apparatus in which any steam or vapor which may escape from the heating receptacle cannot pass outward and upward through the film or stream of milk or liquid treated, and be condensed thereby so as to dilute the said treated milk or liquid.

Other objects of my invention will be readily understood from the description and disclosure herein of an illustrative device embodying it.

Figure 1 is a side elevation of a pasteurizing apparatus embodying my improvements. Fig. 2 is a vertical central section of the same.

In the drawings,—1 represents a suitable liquid or heating receptacle supported in any desired way, preferably by a base or standard 2.

3 is a horizontally disposed heater or pasteurizing plate arranged over the water receptacle 1 and adapted to have its under surface in contact with the water or heating medium in the said receptacle 1.

4 is a rotary annular trough or gutter carried by the pasteurizing plate 3 and extending around its periphery. 5 is a discharge outlet in said gutter, communicating with a discharge spout or nozzle 6.

7 is a stationary annular trough or gutter arranged beneath the trough or gutter 4 carried by the pasteurizing plate. This trough or gutter 7 is adapted to receive any water or liquid of condensed vapors which may escape between the upper edge of the receptacle 1 and the adjacent under surface of the pasteurizing plate 3.

8 are discharge ducts leading from the trough or gutter 7.

9 is an annular stationary trough or gutter surrounding the trough or gutter 7 and arranged to receive the treated liquid which runs into the rotary gutter 4 carried by the pasteurizing plate. The discharge nozzle 6 for the gutter 4 is suitably shaped to direct and deliver the treated milk or liquid into the stationary trough 9.

10 is a discharge duct for the stationary trough 9.

The pasteurizing plate 3 may be rotated in any suitable and well known manner. For this purpose I have shown it suitably connected to the upper end of a vertically arranged drive shaft 11 extending axially through the water receptacle 1, and having its lower end suitably mounted in a step or thrust bearing 12 carried by the base 2. The shaft 12 may be driven in any well known manner. In the drawings, I have shown it geared to a horizontally disposed shaft 13 suitably mounted in the base 2.

14 and 15 are fast and loose pulleys, respectively, on the shaft 13.

16 is a lid or cover fitted to the trough 4. It may rotate with the said trough or be held stationary, as desired. I have found the construction is simplified by having the lid or cover rotate with the trough.

17 is an axially disposed funnel carried by the lid or cover 16 and adapted to direct the material to be treated on to the pasteurizing plate 3 near the center thereof. When the said liquid to be treated is introduced upon said rotating pasteurizing plate, and the latter is rotated, the said liquid will be acted upon centrifugally and its particles will move outward upon said plate in a circuitous path under such centrifugal action until thrown from the said pasteurizing plate into the rotary trough 4 carried by it. Heat may be applied in any desired manner for heating the liquid or medium in the receptacle 1. For the purpose, I have shown an inlet duct 18 for steam connected at its inner end to an injector 19 arranged within the receptacle 1. Any desired means may be employed for effecting the circulation of the heating liquid or medium within the receptacle 1 and against the pasteurizing plate 3.

20 is an outlet duct leading from the water receptacle 1. It is provided with a suitable valve 21.

In operation, the liquid to be treated is directed into the nozzle 17 and is distributed upon the pasteurizing plate 3 at the center thereof. The particles of said liquid travel outward in a circuitous path and are delivered into the rotary trough 4, from which trough, the nozzle 6 directs the treated liquid into the stationary trough 9 and it is discharged therefrom through the outlet duct 10. In the event that any steam or liquid vapor escapes between the lower surface of the pasteurizing plate 3 and the upper annular edge of the water receptacle 1, it is ordinarily condensed along the under surface of the rotary gutter 4 and collects in the gutter 7 from which it is discharged by the ducts 8. Should any vapors escape upward from the stationary trough 7, they cannot possibly pass through a stream or film of the treated liquid, and consequently cannot and will not be condensed by the treated liquid, as they will issue above the discharge port of the nozzle 6.

If desired, the rotary trough 4 may be provided with a plurality of discharge nozzles 6. The pasteurizing plate or rotary element may be shaped in any well known and desired manner. I have shown it as a substantially flat plate, but this is not essential.

In all of the pasteurizing apparatus heretofore devised, of which I am aware, and in which the liquid to be treated is caused to flow outward under centrifugal action over a pasteurizing plate which rotates relatively to its heating receptacle, steam or vapor issuing from the said heating receptacle has had to find its escape through the annular film or attenuated stream of milk or liquid which is substantially continuously discharged during the operation of the machine from the periphery of the pasteurizing plate. As the steam or vapor encounters this annular film or attenuated stream of treated liquid, it is condensed and passes off with the liquid, thereby diluting it and making it impure. With a pasteurizing apparatus constructed in accordance with my present invention, such dilution and rendering impure of the milk or liquid treated is impossible.

What I claim is:—

1. In a pasteurizing apparatus, the combination of a rotatable pasteurizing plate, an annular trough for treated liquid carried by said pasteurizing plate and extending around the periphery thereof, means for directing the liquid to be treated onto the central portion of said pasteurizing plate, means for heating said pasteurizing plate, and means for rotating said pasteurizing plate.

2. In a pasteurizing apparatus, the combination of a rotary pasteurizing plate, an annular trough carried by said plate and arranged around its periphery and having a suitable discharge duct, a stationary heating receptacle for the pasteurizing plate, means for rotating said pasteurizing plate, and means for introducing heating medium into said heating receptacle.

3. In a pasteurizing apparatus, the combination of a rotatable pasteurizing plate, an annular trough carried by said pasteurizing plate at its periphery and having a suitable discharge duct, a stationary heating receptacle for said pasteurizing plate adapted to receive heated liquid, means for heating the liquid in said heating receptacle, and a trough surrounding said heating receptacle and adapted to receive any heating medium that may escape therefrom.

4. In a pasteurizing apparatus, the combination of a rotatable pasteurizing plate, an annular trough carried by said pasteurizing plate at its periphery and having a suitable discharge duct, a stationary heating receptacle for said pasteurizing plate adapted to receive heated liquid, means for heating the liquid in said heating receptacle, a trough surrounding said heating receptacle adapted to receive any heating medium that may escape therefrom, and a trough surrounding said last described trough and adapted to receive from the discharge duct of said rotary trough the treated liquid.

5. In a pasteurizing apparatus, the combination of a rotatable pasteurizing plate, an annular trough for treated liquid carried by said pasteurizing plate, extending around the periphery thereof, and having a suitable discharge duct, a heating receptacle for said pasteurizing plate adapted to receive a heating medium, means surrounding said heating receptacle adapted to collect any of the heating medium that may escape between it and said pasteurizing plate, and a stationary collecting device for the pasteurizing liquid arranged to receive the said treated liquid from said rotary trough.

6. In a pasteurizing apparatus, the combination of a rotatable pasteurizing plate, an annular trough carried by said pasteurizing plate, extending around the periphery thereof and having a laterally extending discharge nozzle, a stationary heating receptacle for said pasteurizing plate, means for introducing steam into said heating receptacle, and a stationary trough surrounding said heating receptacle and adapted to receive the liquid treated from the said discharge nozzle carried by the said pasteurizing plate.

7. In a pasteurizing apparatus, the combination of a rotatable pasteurizing plate, an annular trough carried by said pasteurizing plate, extending around the periphery thereof and having a laterally extending discharge nozzle, a stationary heating receptacle for said pasteurizing plate, means for introducing steam into said heating receptacle, a stationary trough surrounding said heating receptacle and adapted to receive the liquid treated from the said discharge nozzle carried by the said pasteurizing plate, and a centrally perforated cover for said pasteurizing plate and the trough carried thereby.

In testimony whereof I affix my signature in presence of two witnesses.

HANS CHRISTENSEN.

Witnesses:
  CHAS. M. BALL,
  J. B. SMITH.